United States Patent [19]

Hammer et al.

[11] Patent Number: 5,690,977
[45] Date of Patent: Nov. 25, 1997

[54] TUBULAR FOOD CASING HAVING A MODIFIED LIQUID SMOKE SOLUTION APPLIED THERETO AND PROCESS OF MAKING

[75] Inventors: Klaus-Dieter Hammer, Mainz-Mombach; Leo Mans, Saulheim; Manfred Siebrecht; Hermann Winter, both of Wiesbaden, all of Germany

[73] Assignee: Hoechst Aktiengesellschaft, Frankfurt am Main, Germany

[21] Appl. No.: 375,171

[22] Filed: Jan. 18, 1995

Related U.S. Application Data

[63] Continuation of Ser. No. 26,827, Mar. 5, 1993, abandoned.

[30] Foreign Application Priority Data

Mar. 6, 1992 [DE] Germany ............... 42 07 131.3

[51] Int. Cl.$^6$ ................................. A22C 13/00
[52] U.S. Cl. ............... 426/105; 426/135; 428/34.8
[58] Field of Search .................... 426/105, 135, 426/138, 140; 138/118.1; 428/34.8

[56] References Cited

U.S. PATENT DOCUMENTS

| | | |
|---|---|---|
| 2,136,566 | 11/1938 | Schnecko et al. . |
| 2,901,358 | 8/1959 | Underwood et al. . |
| 2,925,621 | 2/1960 | Parth . |
| 3,106,473 | 10/1963 | Hollenbeck . |
| 3,679,435 | 7/1972 | Klenk et al. . |
| 3,873,741 | 3/1975 | Melcer et al. . |
| 3,988,804 | 11/1976 | Regner et al. . |
| 4,104,408 | 8/1978 | Chiu ............................ 426/135 |
| 4,357,371 | 11/1982 | Heinrich et al. ............... 427/238 |
| 4,396,039 | 8/1983 | Klenk et al. ................... 138/118.1 |
| 4,410,011 | 10/1983 | Andrae et al. ................. 138/118.1 |
| 4,442,868 | 4/1984 | Smith et al. ................... 426/135 X |
| 4,446,167 | 5/1984 | Smith et al. ................... 426/650 |
| 4,525,397 | 6/1985 | Chiu .............................. 138/118.1 X |
| 4,563,376 | 1/1986 | Hammer et al. ............... 428/36 |
| 4,834,993 | 5/1989 | Chiu .............................. 426/250 |
| 4,940,615 | 7/1990 | Hammer et al. ............... 428/34.8 |
| 5,096,754 | 3/1992 | Hammer et al. ............... 428/34.8 |

FOREIGN PATENT DOCUMENTS

| | | |
|---|---|---|
| 0 095 616 | 12/1983 | European Pat. Off. . |
| 0 378 069 | 7/1990 | European Pat. Off. . |
| 28 19 686 | 11/1978 | Germany . |
| 28 01 038 | 7/1989 | Germany . |
| 1 201 830 | 8/1970 | United Kingdom . |

*Primary Examiner*—Arthur L. Corbin
*Attorney, Agent, or Firm*—Foley & Lardner

[57] ABSTRACT

A modified liquid smoke solution containing unmodified aqueous liquid smoke solution, an alkaline neutralizing agent, a synthetic and/or natural oil, a viscosity-increasing component, and one or more emulsifier(s) can be applied to the inner and/or outer surface of a cellulose food casing resulting in uniform smoke transfer to encased food.

24 Claims, No Drawings

TUBULAR FOOD CASING HAVING A MODIFIED LIQUID SMOKE SOLUTION APPLIED THERETO AND PROCESS OF MAKING

This application is a continuation of application Ser. No. 08/026,827, filed Mar. 5, 1993, now abandoned.

BACKGROUND OF THE INVENTION

1. Field of the Invention

The invention relates to a tubular food casing, in particular sausage casing, based on cellulose having a modified liquid smoke solution applied to its inner and/or outer surface and the production and use of such a casing.

In addition, the invention relates to the modified liquid smoke solution itself and to a process for producing the food casing.

2. Description of Related Art

The appearance and flavor of processed meat products are a decisive factor for their success in commerce and with the consumer. A common characteristic of many types of meat products is a characteristic smoke flavor and the smoked appearance associated therewith.

Various processes are described in the art which are suitable for imparting this smoke aroma and the corresponding color to the food product. For instance, it is known to incorporate so-called liquid smoke solutions into the meat or sausage mixture or to spray the sausage material with such a solution. However, this conventional processing of the liquid smoke solution has certain accompanying disadvantages, in particular an uneven or deficient smoke color on the surface of the sausage product.

Further processes have therefore been developed in which the liquid smoke solution is applied to the inner or outer surface of a tubular food casing and the desired smoke color and the aroma are transferred from the food casing to the filling material.

However, for this process, the commercially available liquid smoke solutions are not suitable for food casings based on cellulose because of the solutions strongly acidic character.

In the art, additives are described to modify the liquid smoke solutions which, on the one hand, are said to avoid the disadvantages due to the strongly acidic character of the solutions and, on the other hand, are said to give an improved smoked effect by a good transfer of the aroma and the color from the casing to the product.

DE-A 2,813,796 describes the admixture of an alkaline neutralizing agent and a short-chain alcohol to aqueous, liquid smoke solutions. The neutralizing agent increases the pH to above 5, and the short-chain alcohol serves as a solubilizer which prevents the precipitation of the smoke constituents from the alkaline solution. Cellulose hydrate casings can be prepared using this solution, the disadvantages of the acidic medium being prevented by the neutralization. However, the transfer of the smoke aroma and the smoke color from the casing to the sausage meat is deficient.

U.S. Pat. No. 4,446,167 describes smoke solutions to which alkali is added until smoke constituents precipitate and which are then further alkalized until the precipitate has essentially redissolved. In this case, the smoke solutions reach a pH higher than 10; the addition of the abovementioned alcohols as solubilizer can be dispensed with. If desired, the solution can contain, as softener, glycerol, propylene glycol or carboxymethylcellulose at an amount of up to 10% by weight. However, it is an advantage of the present invention that, because of the relatively high water content, softeners such as, for example, propylene glycol need not be present at all or only in small amounts.

U.S. Pat. No. 4,834,993 describes the application of strongly alkalized smoke solutions to the outer surface of food casings which are then shirred. As a result, a particularly uniform distribution of the smoke solution on the shirred, prepared casings is ensured. This is advantageous in comparison with casings having an identical coating on the inner side, since the accumulation of the liquid smoke solution in the shirr folds is avoided. The liquid smoke solutions used are strongly alkalized, as described in U.S. Pat. No. 4,446,167, so that the addition of short-chain alcohols is not necessary.

The art recognizes that a particularly uniform and effective transfer of smoke aroma and color in the production of food products in casings prepared using liquid smoke is particularly desirable. However, all processes and mixtures of liquid smoke solutions proposed hitherto leave a lot to be desired in this respect. This requirement for improved transfer properties of the casings containing liquid smoke also follows from such applications as EP-A 0,095,616, which describes a special method for the extraction of the smoke colorant, which is then again added in concentrated form to the liquid smoke solutions to achieve a better smoke color of the food. However, better transfer of the smoke aroma is certainly not to be expected from such methods.

SUMMARY OF THE INVENTION

It is therefore an object of the present invention to avoid the abovementioned disadvantages of the food casings prepared using liquid smoke solutions known in the art.

In particular, a food casing based on cellulose prepared using a liquid smoke solution is to be provided which ensures a better and a particularly uniform transfer of the smoke aroma and of the smoke color from the prepared casing to the food. The casing should also have at the same time, the good release properties of the inner casing surface required for boiling sausages and scalding sausages.

It is a further object of the invention to modify a liquid smoke solution in such a manner that it is absorbed in relatively large amounts by cellulose hydrate casings.

It is also an object of the invention to provide a modified smoke solution which can be applied to casings and overcomes the disadvantages of the conventionally applied smoke solutions.

It is also an object of the present invention to provide a method of manufacturing such a food casing having the uniform smoke aroma and smoke color and to provide a foodstuff, such as a sausage, encased with such a casing having applied thereto a smoke solution.

In accomplishing the foregoing objectives there has been provided a modified liquid smoke solution comprising a mixture of:

a) an unmodified aqueous liquid smoke solution,
b) an oil,
c) an alkaline neutralizing agent,
d) a viscosity increasing component,
e) one or more emulsifiers.

In accordance with another aspect of the present invention there has been provided a tubular cellulose hydrate food casing having a modified liquid smoke solution applied to one or both of its inner and outer surfaces wherein the modified liquid smoke solution is as described above.

In accordance with another object of the present invention there has been provided a process for the production of a food casing comprising the steps of:

i) moistening a cellulose hydrate casing with water, ii) optionally impregnating the inner and/or outer surface of the casing with a fungicide, iii) applying to the inner and/or outer surface of the casing a modified liquid smoke solution as described above and iv) optionally drying the casing so as to allow further processing of the casing without soaking.

Further objects, features, and advantages of the present invention will become apparent from the detailed description of preferred embodiments which follows.

DETAILED DESCRIPTION OF THE PREFERRED EMBODIMENTS

Mixtures in the sense of the present invention contain an unmodified, aqueous liquid smoke solution which is modified by addition of the other abovementioned constituents. The term "mixture" includes in this case emulsions, true solutions, colloidal suspensions and other types of mixtures in the liquid phase.

The tubular food casings according to the invention prepared using liquid smoke solutions are preferably sausage casings, in particular ready-to-stuff sausage casings. The base materials for the food casings are cellulose hydrate tubes. Any type of tube based on cellulose hydrate may be used, such as cellophane, regenerated cellulose, and/or cellulose hydrate, which may optionally have a fiber paper inlay.

The casings may be produced in any desired manner. For example, these casings may be produced in a conventional manner as seamless tubes by annular extrusion and subsequent coagulation and regeneration of a viscose solution. It is also possible to use tubes having a glued seam which are produced by folding a cellulose web and joining the edges (described in EP-A 0,050,702 and EP-A 0,058,240).

For certain applications, a support tube is used made of cellulose having a fiber reinforcement which, for example, is embedded in the wall of the support tube in the form of a paper web. To produce curved or ring-shaped sausages, support tubes based on cellulose are used in a curved or rounded ring shape, so-called ring casings, which generally have no fiber reinforcement. The curvature is produced, for example, by a single-sided extension of the tube during its production, but other processes are also known as described in U.S. Pat. Nos. 2,136,566, 2,925,621, and 3,679,435, and EP-A 0,050,702.

The prepared food casing can be used as a flattened tube for filling with the filling material as a section or from the roll. Alternatively, shirred tubular casings, so-called shirred sticks, can be produced, conventional shirring devices such as described in U.S. Pat. No. 3,988,804 being used.

According to the invention, the food casings are prepared on their inner and/or outer surface with a modified liquid smoke solution. The modified liquid smoke solution contains an undiluted, unmodified, aqueous liquid smoke solution. Any known smoke solution can be used. A current commercial liquid smoke solution is a solution of natural wood smoke constituents which is prepared by combustion of wood, for example hickory or maple, and trapping the natural smoke constituents in a liquid medium, for example water. It is also possible to isolate the liquid smoke to be used by dry distillation of wood. Liquid smoke solutions are generally highly acidic and usually have a pH of about 2.5 or less, but some partially neutralized liquid smoke solutions having a pH up to about 5 are also available. The latter smoke solutions additionally contain a solvent in order to keep the liquid smoke constituents in solution.

For the purposes of the invention, an unmodified liquid smoke solution is preferred which is a solution of natural wood smoke constituents. This solution is prepared by incomplete combustion of hard wood and absorption of the smoke produced during this in an aqueous solution under controlled conditions. The limited combustion minimizes the formation of benzopyrene, and some of the undesired hydrocarbon compounds or tars are kept in insoluble form so that these constituents can be eliminated from the final liquid smoke solution. In this procedure, the desired wood constituents are thus absorbed in the solution in a balanced quantitative composition, whereas the undesired constituents are eliminated. The liquid smoke solution isolated in this manner contains the coloring and flavor-forming smoke constituents in dissolved form and is representative of the total spectrum of smoke colors and smoke flavor notes without preferring a particular type. The apparatuses and the process for the preparation of liquid smoke solutions of the preferred type are described in more detail in U.S. Pat. No. 3,106,473 and U.S. Pat. No. 3,873,741, which are hereby incorporated by reference.

The unmodified liquid smoke solution is contained in the total mixture in any desired amount such that the desired smoke flavor and appearance are imparted. Generally an amount of at least about 30% by weight is used, the range from about 35 to about 60% by weight being preferred, in particular about 40 to about 50% by weight, in each case based on the total weight of the mixture.

The alkaline neutralizing agents suitable for the purposes of the invention are all known water-soluble alkaline materials. For example potassium hydroxide, sodium hydroxide, ammonium hydroxide, sodium carbonate, sodium bicarbonate, sodium phosphate, disodium hydrogen phosphate and trisodium phosphate are useful. The alkaline materials can be added to the mixture in any desired manner such as in solid form or as a concentrated solution. The use of the strongest alkaline materials has the particular advantage that the concentration of the smoke constituents is kept as high as possible in the mixture.

The amount of the alkaline neutralizing agent present in the total mixture substantially depends on the acidity and composition of the particular commercial unmodified liquid smoke solution to be neutralized and on the particular neutralizing agent used. That is, the neutralizing agent is added in amounts so that the pH of the mixture exceeds at least about 5 and preferably is in the range from about 8 to about 14, and is generally about 8.5 to about 12.

The viscosity-increasing components of the present invention are any components which increase the viscosity of the mixture so as to allow the casing to retain a suitable amount of the mixture so that the smoke aroma can be successfully transferred to the encased foodstuffs. They include cellulose derivatives or starch derivatives, for example CMC, hydroxymethyl-starch or hydroxyethyl-starch; alginates are preferably used. Alginates are salts of alginic acid, in particular alkali metal salts or alkaline earth metal salts. Alginic acid itself is a colorless polysaccharide containing carboxyl groups having a mean molecular weight between about 100,000 and about 240,000. Chemically, alginic acid is composed of 1,4-β-glycosidically linked D-mannuronic acid units having occasional inserts of 1,4-

α-glycosidically bound L-guluronic acid units. Alginic acid as such is a natural product and is found in considerable amounts in marine brown algae.

For the desired viscosity-increasing effect, the mixture generally should contain at least about 0.5% by weight of the alginates, (when alginates are used). The range from about 1 to about 3% by weight is preferred, in particular about 1.5 to about 2.5% by weight. The viscosity (measured as delivery time in the Ford 4 cup in seconds) of the unmodified smoke solution, which is generally about 8 to about 12 seconds, is increased by this additive to about 40 to about 80 seconds, preferably 50 to 65 seconds.

Surprisingly, as a result of this viscosity increase of the liquid smoke solution, a considerably greater amount of smoke solution is retained on the inner and/or outer surface of the food casing, allowing constituents of the mixture to diffuse markedly better into the casing cross section. This increase in the application rate due to increased diffusion of the liquid smoke solution is essential for the improvements according to the invention and contributes decisively to the improved transfer of smoke aroma and smoke color. In particular, in the preferred range of about 1 to about 3% by weight of the viscosity increase, the application rate of liquid smoke solution particularly increases, where at the same time it can be distributed very well on the surface.

Furthermore, the addition of an oil component contributes to the initially mentioned desired improvements. In particular, the absorption and transfer of the coloring aroma constituents of the liquid smoke by the cellulose are surprisingly improved by the oil. In principle, any oil, natural or synthetic or mixtures thereof are suitable. For example natural oils such as olive oil or rapeseed oil, sunflower oil, lecithin or synthetic mono-, di- and triglycerides, paraffin oil, and silicone oils are useful. Among the glycerides, those having 7 to 12 carbon atoms, in particular having 8 to 10 carbon atoms, in the fatty acid radical are preferred. An embodiment having lecithin as the oil component has proved to be particularly advantageous.

Lecithin belongs to the phosphatides, in which the phosphoric acid is esterified on the one hand with choline and on the other hand with glycerol, the remaining hydroxyl groups of the glycerol being themselves further esterified with long-chain fatty acids. Lecithin as such is a natural product and on its extraction from biological material, as a result of the diversity of the fatty acid radicals, mixtures are almost always obtained. The oils are added to the liquid smoke solution in an amount effective to accomplish the above noted improvements, with about 2 to about 30% by weight of the oil, based on the total weight of the mixture being useful and about 5 to about 20% by weight, in particular about 10 to about 15% by weight, being preferred.

To emulsify the additives, any conventional emulsifier or mixture of emulsifiers, can be used. For example alkyl sulfonates, alkylaryl sulfonates, alkyl sulfates, alkylaryl sulfates or nonionic emulsifiers such as ethoxylated alcohols or amines are useful. Monoesters of fatty acids or polyvalent alcohols, such as sorbitol monoester or alkanediols such as 1,2-propanediol, are also suitable as emulsifiers.

The emulsifiers are added in emulsifying effective amounts with amounts of about 0.5 to about 15% by weight, preferably about 1 to about 5% by weight, based on the weight of the mixture being used. It has surprisingly been found that the addition of the emulsifiers in the liquid smoke solution enables an extraordinarily uniform application of the mixture to the casings. In addition, the diffusion of the smoke constituents into the casing material is improved when emulsifiers are used.

In addition to the additives for the unmodified smoke solution mentioned above, further conventional additives can be used in their particular effective amounts.

The casings prepared using liquid smoke solutions preferably have a relatively high moisture content in order to allow their processing without soaking. For fiber-reinforced cellulose hydrate casings, a moisture content of greater than about 22% by weight, in particular about 25 to about 35%, is preferred; smaller cellulose hydrate casings without fiber reinforcement generally have a preferred moisture content from about 15 to about 20% by weight.

Since the prepared food casings are processed without soaking, embodiments using a fungicidal outer preparation are preferred. The fungicide treatment is carried out before or after the liquid smoke preparation is applied to the casing. Such fungicidal preparations may be any known in the art, and preferably contain heterocyclic compounds such as benzimidazole compounds or isothiazolone compounds or di-n-decylammonium compounds. The latter are preferably used as a mixture with a further fungicide, for example a salt of sorbic acid and/or an isothiazolone compound and/or glycerol monolaurate. These preferred fungicidal preparations are described in EP-A 0,378,069.

Food casings which are prepared according to the invention using the modified liquid smoke solution are produced according to any known conventional processes, known per se, for cellulose hydrate casings.

Apart from the conventional glycerol-containing casings, alginate-containing, glycerol-free fiber-reinforced cellulose hydrate tubes such as described in DE-A 4,002,083 have particularly proved themselves useful. They ensure a better uniform application rate because no glycerol can accumulate in the preparation solution and they have more expedient transfer properties because the glycerol can likewise not interfere with the smoke solution.

If required, the food casing can be furnished with a conventional protein impregnation on its inner surface. Such an impregnation generally occurs prior to treatment with the smoke solution. All common natural protein compounds of animal or vegetable origin are suitable in principle, such as for example gelatin, soya protein, wheat protein or peanut protein. Protein impregnations based on casein have proved to be particularly advantageous.

The modified smoke solution may be applied to the casing in any desired manner. For example, to apply the modified smoke solution to dried, optionally fiber-reinforced, cellulose hydrate tubes, the tubes are initially moistened with water to a moisture content of 8 to 12% by weight. The moistened tubes are then treated on their outer and/or inner side with the modified liquid smoke solution according to the invention and, if required, on their outer side additionally with the fungicidal preparation according to one of the numerous known processes, such as described in GB-A 1,201,830, U.S. Pat. No. 2,901,358, DE-A 2,801,038, or DE-C 3,012,250. The fungicide preparation may be applied before or after the application of the modified liquid smoke.

The application of the liquid smoke solution to the inner and/or outer side of the tubular casing is preferably carried out by filling the liquid mixture to be applied into the tubular casing or by application on the outer surface after precipitation of the cellulose hydrate gel from viscose and after drying of the casing, the dried casing material being brought to the desired or slightly increased processing moisture by treatment with the modified liquid smoke solution.

After the application of the smoke solution according to the described process, in the subsequent drying process in the flattened or inflated state, a final moisture content of the casing is preferably established which permits processing without soaking; a moisture content of about 25 to about 35% by weight, based on the dry weight of the casing, is preferred, for fiber reinforced casings. The material is then tied at one end to give sausage casings, preferably shirred.

Surprisingly, the transfer of smoke aroma and smoke color from casings prepared using liquid smoke solution to the filling material was considerably improved by the present invention. The modified liquid smoke solutions according to the invention contain a specific combination of impregnation components which enable, in their composition according to the invention, a wholly surprising improvement of the essential properties of the casings.

As a result of the special formulation, the amount of liquid smoke solution absorbed by the cellulose hydrate material was greatly increased, in particular, glycerol-free food casings absorb the modified liquid smoke solution almost completely. At the same time, the mixture can also be uniformly applied, as a result of which undesired spotting on the surface of the filling material is avoided. The desired transfer of smoke color and smoke aroma to the filling material by the casings according to the invention has been significantly improved in comparison to the art. The surface of the filling material has a uniform smoke color without spots, and the filling material itself has a strong smoke flavor. In addition, the casing shows the good release properties desirable for certain sausage varieties.

The invention is explained in more detail by the following examples, but without restricting it to the specifically illustrated embodiments.

EXAMPLE 1

A glycerol-free, fiber-reinforced cellulose hydrate sausage casing having a diameter of 60 mm, with an internal protein impregnation and an initial moisture content of 10 to 12% was passed through a water bath which contained 1% Bardac 22 (didecyl-dimethylammoniumchloride) as fungicide. The inner surface of the casing was then impregnated with a liquid smoke solution by squeezing off a liquid slug, located in the casing, using a pair of nip rolls. The liquid smoke solution used had the following composition:

6,000 ml of ®Zesti Smoke Code 10 from Meat Industry Supplies, Inc.
3,600 ml of 5N NaOH
5,000 ml of a 6% alginate solution
1,700 ml of lecithin
500 ml of Genapolx080

Genapol is an emulsifier composed of isotridecylalcohol and ethylene oxide.

The impregnated casing was not dried, but was shirred at a moisture content of greater than 35%. The food casing was filled with meat sausage emulsion or long-life sausage emulsion. The meat sausage was cooked. The filled casing could be peeled off very well. The sausage meat surface showed a highly intensive and very uniform smoke color.

EXAMPLE 2

A glycerol-free, fiber-reinforced 65 mm diameter cellulose hydrate sausage casing having an initial moisture content of 8 to 10% was, as described in Example 1, soaked, furnished with fungicide and impregnated with a liquid smoke solution of the following composition:

4,500 ml of ®Smokez Supreme from Red Arrow Products Corp.
2,700 ml of 5N NaOH
800 ml of a 6% alginate solution
900 ml of lecithin
250 ml of Genapolx080.

The casing was shirred and the shirred stick was stored for 7 days in the hot climate chamber. The shirred stick could be subsequently processed in the absence of soaking without problems. The filled casing had a glossy surface, could be peeled off easily and showed a good color transfer. The sausage had a strong smoke flavor.

EXAMPLE 3

A glycerol-containing, fiber-reinforced 40 mm diameter cellulose hydrate sausage casing having an initial moisture content of 10 to 12% was treated as described in Example 1 and then impregnated with the following liquid smoke solution:

4,800 ml of ®Zesti Smoke TP Special Blend from Meat Industry Supplies, Inc.
4,000 ml of alginate (6%)
1,000 ml of lecithin
300 ml of Genapolx080.

The casing could be processed as a section without soaking. The filling product showed a good and uniform smoke color and a good smoke aroma.

EXAMPLE 4

A glycerol-containing, nonfiber-reinforced 23 mm diameter (peeler) cellulose hydrate sausage casing having an initial moisture content of 10 to 12% was treated analogously to the procedure of Example 1 and impregnated, filled with meat sausage emulsion, cooked and peeled using a high-speed machine.

EXAMPLE 5

A glycerol-free, fiber-reinforced 130 mm diameter cellulose hydrate casing having an initial moisture content of 8 to 10% was furnished with fungicide as described in Example 1 and impregnated as in Example 1. It was filled with boiled ham, cooked and could be peeled off very easily. The surface of the boiled ham showed an intensive uniform smoke color.

What is claimed is:

1. A tubular cellulose hydrate food casing having a modified liquid smoking solution applied to one or both of its inner and outer surfaces wherein the modified liquid smoking solution comprises a mixture of:
    a) an unmodified aqueous liquid smoke solution,
    b) an oil or lecithin,
    c) an alkaline neutralizing agent,
    d) a viscosity increasing component, and
    e) one or more emulsifiers.

2. A food casing as claimed in claim 1, wherein component (b) comprises a synthetic oil.

3. A food casing as claimed in claim 1, wherein component (b) comprises a natural oil.

4. A food casing as claimed in claim 1, wherein the alkaline neutralizing agent is contained in an amount such that the mixture has a pH of about 8 to about 14.

5. A food casing as claimed in claim 4, wherein said mixture has a pH of about 8.5 to about 12.

6. A food casing as claimed in claim 1 wherein component (b) is contained in an amount of about 2 to about 30% by weight of the mixture.

7. A food casing as claimed in claim 1, wherein the emulsifier is contained in an amount of about 0.5 to about 15% by weight of the mixture.

8. A food casing as claimed in claim 1, wherein the viscosity of the mixture is in a range from about 40 to about 80 seconds.

9. A food casing as claimed in claim 1, wherein the unmodified, aqueous liquid smoke solution is contained in an amount of at least about 30% by weight of the mixture.

10. A food casing as claimed in claim 1, wherein a fungicidal external coating is applied to the outer surface of the casing.

11. A food casing as claimed in claim 1, wherein the food casing, after application of the modified liquid smoke solution, has a moisture content of about 25 to about 35% by weight.

12. A food casing as claimed in claim 1, wherein component (b) comprises lecithin.

13. A food casing as claimed in claim 1, wherein said viscosity-increasing component is an alginate.

14. A food casing as claimed in claim 1, wherein the casing is a fiber-reinforced glycerol-free cellulose hydrate casing.

15. A food casing as claimed in claim 14, wherein the fiber-reinforced glycerol-free cellulose hydrate casing comprises alginate.

16. A food casing as claimed in claim 14, wherein the viscosity increasing component (d) comprises a cellulose or starch derivative.

17. A food casing as claimed in claim 14, wherein component (b) comprises olive oil, rapeseed oil, sunflower oil, paraffin oil, silicone oil, or mono-, di-, or triglycerides.

18. A food casing as claimed in claim 14, wherein component (e) comprises an alkyl sulfonate, an alkylaryl sulfonate, an alkane diol, an ethoxylated alcohol or amine, a monoester of fatty acid or a polyvalent alcohol.

19. A food casing as claimed in claim 1, wherein the food casing is a sausage casing.

20. Smoked sausage encased with the food casing as claimed in claim 1.

21. A food casing prepared by a process comprising the steps of:
   (i) moistening a cellulose hydrate casing with water,
   (ii) optionally impregnating the inner and/or outer surface of the casing with a fungicide,
   (iii) applying to the inner and/or outer surface of the casing a modified liquid smoking solution comprising a mixture of:
      (a) an unmodified aqueous liquid smoke solution,
      (b) an oil or lecithin,
      (c) an alkaline neutralizing agent,
      (d) a viscosity increasing component, and
      (e) one or more emulsifiers, and
   (iv) optionally drying the casing so as to allow further processing of the casing without soaking.

22. A casing as claimed in claim 21, wherein the food casing is shirred after step (iv).

23. A process for the production of a food casing, comprising the steps of:
   i) moistening a cellulose hydrate casing with water,
   ii) optionally impregnating the inner and/or outer surface of the casing with a fungicide,
   iii) applying to the inner and/or outer surface of the casing a modified liquid smoke solution comprising a mixture of:
      a) an unmodified aqueous liquid smoke solution,
      b) an oil or lecithin,
      c) an alkaline neutralizing agent,
      d) a viscosity increasing component, and
      e) one or more emulsifiers, and
   iv) optionally drying the casing so as to allow further processing of the casing without soaking.

24. A process as claimed in claim 23, wherein the food casing is shirred after step iv).

* * * * *